July 17, 1923.
L. ERICKSON
1,462,103
VEHICLE TRAILING DEVICE
Filed July 5, 1921
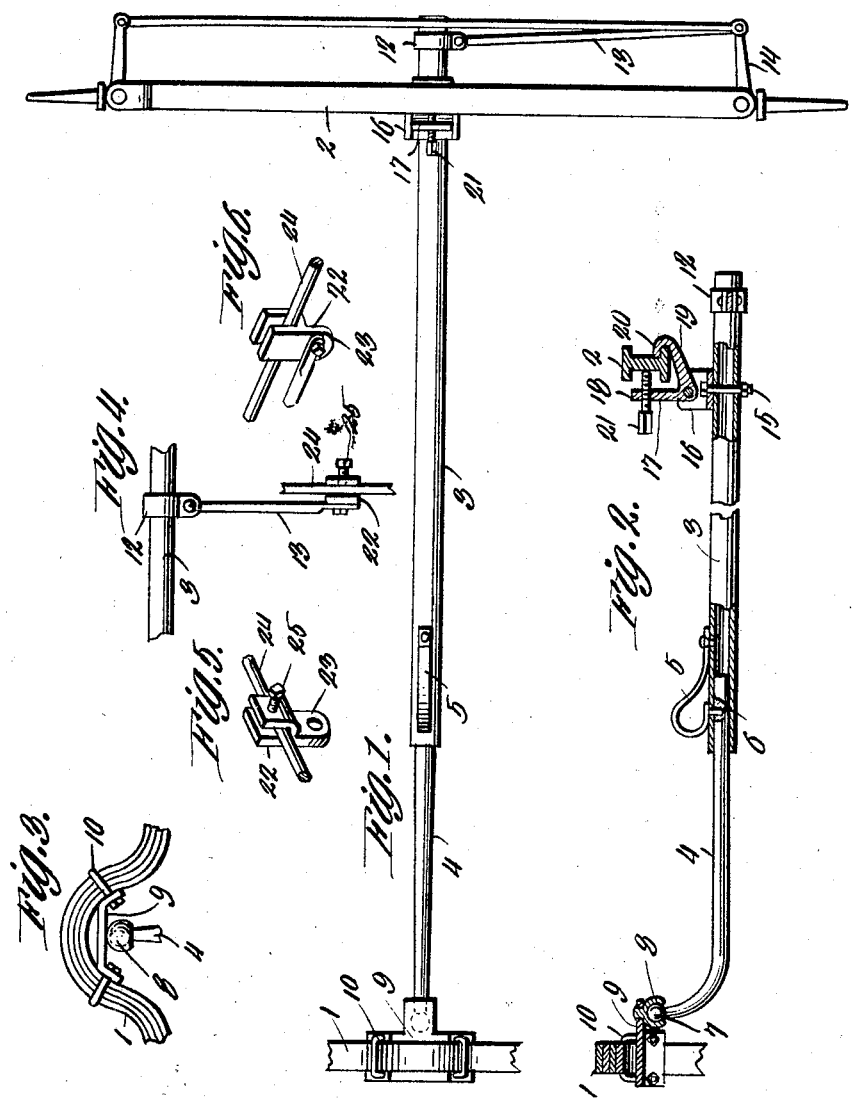
WITNESSES
LOUIS ERICKSON INVENTOR.
BY
ATTORNEY.

Patented July 17, 1923.

1,462,103

UNITED STATES PATENT OFFICE.

LOUIS ERICKSON, OF LA CROSSE, WISCONSIN.

VEHICLE TRAILING DEVICE.

Application filed July 5, 1921. Serial No. 482,398.

*To all whom it may concern:*

Be it known that I, LOUIS ERICKSON, a citizen of the United States, residing at La Crosse, in the county of La Crosse and State of Wisconsin, have invented certain new and useful Improvements in a Vehicle Trailing Device, of which the following is a specification.

This invention relates to a vehicle trailing device and has for its principal object to provide means for towing a vehicle whereby the towed vehicle may be retained in substantial alignment with the path of travel of the towing vehicle.

Another object of the invention is to provide a device of this nature which may be quickly attached to and detached from the vehicle with which it is to be used.

Another object of the invention is to provide a towing bar, the length of which may be adjusted to suit the circumstances so as to vary the distance between the vehicles.

A still further object of the invention is to generally improve upon vehicle trailing devices of this character by providing a device which will be of extremely simple, durable and inexpensive construction, one which is efficient and reliable in operation, and well adapted to the purpose for which it is designed.

With these and numerous other objects in view, the invention resides in certain novel features of construction, and the combination and arrangement of parts as will be hereinafter fully described and claimed.

In the drawing:—

Figure 1 is a top plan view of the trailing device,

Figure 2 is a fragmentary elevational view thereof, parts being shown in section, Figure 3 is a detailed view showing the ball and socket connection with the towing vehicle, Figure 4 is a detailed view showing in plan means for attaching the steering rod to the steering mechanism of a vehicle, Figure 5 is a detailed perspective view thereof, and Figure 6 is a detailed perspective view thereof taken from the other sides than that shown in Figure 5.

Referring to the drawing in detail it will be seen that the illustration disclosed in Figures 1, 2 and 3 represent parts of a Ford car whereas the parts disclosed in Figures 4, 5 and 6 may be used with most any other motor vehicle. Referring particularly to Figures 1, 2 and 3 it will be noted that 1 designates the rear spring of a Ford automobile and 2 the front axle of a Ford automobile. The spring 1 is a portion of the towing vehicle whereas the axle 2 is a portion of the towed vehicle.

The towing bar which is disposed between the two vehicles comprises a tube 3 and the member 4 which has one end thereof inserted within the tube 3. A spring 5 is fixed to the tube 3 and carries a pin 6 which passes through a suitable aperture in the tube 3 and also through a suitable aperture in the member 4. By providing the member 4 with a plurality of apertures it will be seen that the length of the towing bar may be varied to suit occasions. At the forward end of the towing bar or at the end of the member 4 there is provided a ball 7 adapted to fit in the socket 8 which is carried by the plate 9. This plate 9 is held in engagement with the rear spring 1 of the towing vehicle by means of the U-bolts 10.

At the other end of the towing bar or at the end of the tube 3 there is situated a clamp 12 for pivotally supporting the steering rod 13 which has its end pivotally connected with one of the steering knuckles 14 of the rear vehicle. The tube 3 is pivotally connected to the axle 2 intermediate its ends by means of a mechanism which includes a bolt 15 which passes through the tube 3 and pivotally supports a U-shaped bracket 16 in which is pivotally mounted an engaging casting. This casting includes a plate 18 and a hook member 19. The plate 18 and hook member 19 diverge from each other and form an angle of approximately fifty degrees. The hooked end 20 of the hook member 19 engages the lower flange of the axle 2 and the set screw which is threadedly mounted in the plate 18 is in binding engagement with the web of the axle 2.

Referring especially to Figures 4, 5 and 6 it will be noted that means is provided whereby the steering rod 13 may be attached to vehicles other than the Ford automobiles. This means consists of a U-shaped casting 22 which is provided with a lip 23 to which is pivotally connected the end of the rod 13. The connecting rod 24 of the towed vehicle is positioned within the channel formed by the U-shaped casting and a set screw 25 holds this rod 24 securely in place.

It is thought that the construction and operation of the invention will now be thoroughly understood without a more extended explanation. As numerous changes in form, construction and arrangement of parts may be made without departing from the spirit of the invention, I do not wish to be limited to the construction herein shown and described other than as claimed.

Having thus described my invention what I claim as new is:—

A device for attaching a towing bar to a towed vehicle including a U-shaped bracket, an engaging casting pivotally mounted in the bracket and including a plate, and a hook member, said plate and hooked member diverging from each other, and a set screw mounted in the plate.

In testimony whereof I affix my signature in presence of two witnesses.

LOUIS ERICKSON.

Witnesses:
O. J. SWENNES,
HELEN VERKET.